US008165035B2

(12) United States Patent
Che et al.

(10) Patent No.: US 8,165,035 B2
(45) Date of Patent: Apr. 24, 2012

(54) ACK/NACK DTX DETECTION

(75) Inventors: Xiang Guang Che, Beijing (CN); Peng Chen, Beijing (CN); Esa Tiirola, Kempele (FI); Timo Lunttila, Espoo (FI); Kari P. Pajukoski, Oulu (FI)

(73) Assignee: Nokia Siemens Networks Oy, Espoo (FI)

( * ) Notice: Subject to any disclaimer, the term of this patent is extended or adjusted under 35 U.S.C. 154(b) by 714 days.

(21) Appl. No.: 12/286,883

(22) Filed: Oct. 2, 2008

(65) Prior Publication Data
US 2009/0129317 A1 May 21, 2009

Related U.S. Application Data

(60) Provisional application No. 60/997,237, filed on Oct. 2, 2007, provisional application No. 61/192,953, filed on Sep. 22, 2008.

(51) Int. Cl.
G06F 11/30 (2006.01)
H04B 7/005 (2006.01)
H04B 7/00 (2006.01)
H04J 3/06 (2006.01)

(52) U.S. Cl. ........ 370/252; 370/278; 370/350; 370/468; 455/515

(58) Field of Classification Search .................. 370/203, 370/229, 252, 278–280, 310–350, 468; 455/401, 455/515
See application file for complete search history.

(56) References Cited

U.S. PATENT DOCUMENTS 8,045,513 B2 * 10/2011 Kim et al. ................... 370/329
2004/0202147 A1 * 10/2004 Hakkinen et al. ............ 370/351
2009/0213769 A1 * 8/2009 Shen et al. ................... 370/280

FOREIGN PATENT DOCUMENTS

WO PCT/IB2008/051025 3/2007
WO WO-2007/108602 A1 9/2007
WO WO-2008/114214 A2 9/2008

OTHER PUBLICATIONS

"PUSCH Error Case Handling for ACK/NACK Bundling in LTE TDD", 3 GPP TSG RAN WGI Meeting #54, R1-083091, Aug. 2008, 5 pgs.
"$3^{rd}$ Generation Partnership Project; Technical Specification Group Radio Access Network; Evolved Universal Terrestrial Radio Access (E-UTRA); Physical layer procedures (Release 8)", 3GPP TS 36.213 V8.3.0 (May 2008), 45 pgs.
3GPP TSG-RAN WG1 #54, R1-083417, "Way forward on TDD ACK/NAK on PUSCH", Jeju, Korea, Aug. 18-22, 2008, 5 pages.
TSG-RAN WG1 #54, R1-083066, "Transmission of ACK/NAK on PUSCH for LTE TDD", Jeju, South Korea, Aug. 18-22, 2008, 5 pages.

(Continued)

Primary Examiner — Tri H Phan
(74) Attorney, Agent, or Firm — Harrington & Smith

(57) ABSTRACT

In a first aspect of the invention there is a method, apparatus, and executable software product for receiving scheduling information, determining that at least one downlink allocation of the scheduling information was not received, sending a reply to the received scheduling that comprises an indication of discontinuous transmission in response to the determining. In another aspect of the invention there is a method an apparatus to send scheduling information, and receive a reply to the scheduling information comprising an indication of discontinuous transmission that at least one downlink allocation of the scheduling information was not received.

35 Claims, 9 Drawing Sheets

OTHER PUBLICATIONS

3GPP TSG RAN WG1 Meeting #54, R1-083084, "Multiple ACK/NACK transmission on PUSCH for LTE TDD", Jeju, Korea, Aug. 18-22, 2008, 4 pages.

3GPP TSG RAN WG1 Meeting #54, R1-082861, "4 bits ACK/NACK generation in TDD configuration 5", Jeju, Korea, Aug. 18-22, 2008, 4 pages.

"Improved Error Detection in a Wireless Communication System", U.S. Appl. No. 60/919,048, filed Mar. 19, 2007.

"$3^{rd}$ Generation partnership Project; Technical Specification Group Radio Access Network; Evolved Universal Terrestrial Radio Access (E-UTRA); Multiplexing and channel coding (Release 8)", 3GPP TS 36.212 V8.3.0, May 2008, 48 pgs.

"$3^{rd}$ Generation Partnership Project; Technical Specification Group Radio Access Network; Evolved Universal Terrestrial Radio Access (E-UTRA); Physical Channels and Modulation (Release 8)", 3GPP TS 36.211 V8.3.0, May 2008, 79 pgs.

Texas Instruments: "Multiple Ack/Nak Transmission in TDD", 3GPP Draft; R1-082489, $3^{rd}$ Generation Partnership Project (3GPP), Mobile Competence Centre; 650, Route Des Lucioles; F-06921 Sophia-Antipolis Cedex; France, no. Warsaw, Poland; 20080630, Jun. 24, 2008, XP050110759.

Texas Instruments: "Support of Multiple ACK/NAK Transmission in TDD", 3GPP Draft; R1-081988, $3^{rd}$ Generation Partnership Project (3GPP), Mobile Competence Centre; 650, Route Des Lucioles; F-06921 Sophia Antipolis Cedex; France, no. Kansas City, USA; 20080505, Apr. 29, 2008, XP050110335.

Ericsson: "On Multiple Ack/Nak for Lte TDD", 3GPP Draft; R1-082001, $3^{rd}$ Generation Partnership Project (3GPP), Mobile Competence Centre; 650, Route Des Lucioles; F-06921 Sophia-Antipolis Cedex; France, no. Kansas City, USA 20080505, Apr. 29, 2008, XP050110348.

Philips: "Arq for Multiple Data Streams in HSDPA", 3GPP Draft; R1-01-1057, $3^{rd}$ Generation Partnership Project (3GPP), Mobile Competence Centre; 650, Route Des Lucioles; F-06921 Sophia-Antipolis Cedex; France, 20011105, Nov. 1, 2001, XP050111078.

Motorola: "Uplink Signaling Issues", 3GPP Draft; R1-02-0288, $3^{rd}$ Generation Partnership Project (3GPP), Mobile Competence Centre; 650, Route Des Lucioles; F-06921 Sophia-Antipolis Cedex; France, no. Orlando, USA 20020218, Feb. 14, 2002, XP050095868.

3GPP TSG RAN WG1 Meeting #50, R1-073653, "Detection and DTX Performance of CQI+ACK/NACK transmitted on PUCCH", Athens, Greece, Aug. 2007, 5 pages.

3GPP TSG RAN WG1 Meeting #50, R1-073618, "Usage of Cyclic Shifts and block-wise spreading codes for Uplink ACK/NACK", Athens, Greece, Aug. 2007, 5 pages.

* cited by examiner

| INDEX | DA0 | DA1 | CODING BITS |
|---|---|---|---|
| 0 | ACK | ACK | 111 |
| 1 | ACK | NAK | 101 |
| 2 | ACK | DTX | 100 |
| 3 | NAK | ACK | 11 |
| 4 | DTX | ACK | 10 |
| 5 | NAK | NAK | 1 |
| 6 | NAK/DTX | DTX | 0 |
| 6 | DTX | NAK/DTX | 0 |
| 7 | — | — | 110 |

FIG.5A

| INDEX | DA0 | DA1 | DA2 | CODING BITS |
|---|---|---|---|---|
| 0 | ACK | ACK | ACK | 1111 |
| 1 | ACK | ACK | NAK | 1101 |
| 2 | ACK | ACK | DTX | 1100 |
| 3 | ACK | NAK | ACK | 1011 |
| 4 | ACK | DTX | ACK | 1010 |
| 5 | ACK | NAK | NAK | 1001 |
| 6 | ACK | NAK/DTX | DTX | 1000 |
| 6 | ACK | DTX | NAK/DTX | 1000 |
| 7 | NAK | ACK | ACK | 111 |
| 8 | DTX | ACK | ACK | 110 |
| 9 | NAK | ACK | NAK | 101 |
| 10 | NAK/DTX | ACK | DTX | 100 |
| 10 | DTX | ACK | NAK/DTX | 100 |
| 11 | NAK | NAK | ACK | 11 |
| 12 | NAK/DTX | DTX | ACK | 10 |
| 12 | DTX | NAK/DTX | ACK | 10 |
| 13 | NAK | NAK | NAK | 1 |
| 14 | NAK/DTX | NAK/DTX | DTX | 0 |
| 14 | NAK/DTX | DTX | NAK/DTX | 0 |
| 14 | DTX | NAK/DTX | NAK/DTX | 0 |
| 15 | — | — | — | 1110 |

FIG.5B

| INDEX | DA0 | DA1 | DA2 | DA3 | CODING BITS |
|---|---|---|---|---|---|
| 0 | ACK | ACK | ACK | ACK | 11111 |
| 1 | ACK | ACK | ACK | NAK | 11101 |
| 2 | ACK | ACK | ACK | DTX | 11100 |
| 3 | ACK | ACK | NAK | ACK | 11011 |
| 4 | ACK | ACK | DTX | ACK | 11010 |
| 5 | ACK | ACK | NAK | NAK | 11001 |
| 6 | ACK | ACK | NAK/DTX | DTX | 11000 |
| 6 | ACK | ACK | DTX | NAK/DTX | 11000 |
| 7 | ACK | NAK | ACK | ACK | 10111 |
| 8 | ACK | DTX | ACK | ACK | 10110 |
| 9 | ACK | NAK | NAK | NAK | 10101 |
| 10 | ACK | NAK/DTX | ACK | DTX | 10100 |
| 10 | ACK | DTX | ACK | NAK/DTX | 10100 |
| 11 | ACK | NAK | NAK | ACK | 10011 |
| 12 | ACK | NAK/DTX | DTX | ACK | 10010 |
| 12 | ACK | DTX | NAK/DTX | ACK | 10010 |
| 13 | ACK | NAK | NAK | NAK | 10001 |
| 14 | ACK | NAK/DTX | NAK/DTX | DTX | 10000 |
| 14 | ACK | NAK/DTX | DTX | NAK/DTX | 10000 |
| 14 | ACK | DTX | NAK/DTX | NAK/DTX | 10000 |
| 15 | NAK | ACK | ACK | ACK | 1111 |
| 16 | DTX | ACK | ACK | ACK | 1110 |
| 17 | NAK | ACK | ACK | NAK | 1101 |
| 18 | NAK/DTX | ACK | ACK | DTX | 1100 |
| 18 | DTX | ACK | ACK | NAK/DTX | 1100 |
| 19 | NAK | ACK | NAK | ACK | 1011 |
| 20 | NAK/DTX | ACK | DTX | ACK | 1010 |
| 20 | DTX | ACK | NAK/DTX | ACK | 1010 |
| 21 | NAK | ACK | NAK | NAK | 1001 |
| 22 | NAK/DTX | ACK | NAK/DTX | DTX | 1000 |
| 22 | NAK/DTX | ACK | DTX | NAK/DTX | 1000 |
| 22 | DTX | ACK | NAK/DTX | NAK/DTX | 1000 |
| 23 | NAK | NAK | ACK | ACK | 111 |
| 24 | NAK/DTX | DTX | ACK | ACK | 110 |
| 24 | DTX | NAK/DTX | ACK | ACK | 110 |
| 25 | NAK | NAK | ACK | NAK | 101 |
| 26 | NAK/DTX | NAK/DTX | ACK | DTX | 100 |
| 26 | NAK/DTX | DTX | ACK | NAK/DTX | 100 |
| 26 | DTX | NAK/DTX | ACK | NAK/DTX | 100 |
| 27 | NAK | NAK | NAK | ACK | 11 |
| 28 | NAK/DTX | NAK/DTX | DTX | ACK | 10 |
| 28 | NAK/DTX | DTX | NAK/DTX | ACK | 10 |
| 28 | DTX | NAK/DTX | NAK/DTX | ACK | 10 |
| 29 | NAK | NAK | NAK | NAK | 1 |
| 30 | NAK/DTX | NAK/DTX | NAK/DTX | DTX | 0 |
| 30 | NAK/DTX | NAK/DTX | DTX | NAK/DTX | 0 |
| 30 | NAK/DTX | DTX | NAK/DTX | NAK/DTX | 0 |
| 30 | DTX | NAK/DTX | NAK/DTX | NAK/DTX | 0 |
| 31 | — | — | — | — | 0 |

FIG.5C

ACK/NACK DTX DETECTION

CROSS-REFERENCE TO RELATED APPLICATIONS

This application claims priority to U.S. Provisional Patent Application Ser. No. 60/997,237 (filed Oct. 2, 2007) and to U.S. Provisional Application 61/192,953 filed Sep. 22, 2008 (Express Mail No. EV913092230US), both of which are entitled "IMPROVED ACK/NACK DTX DETECTION FOR LTE", the contents of which are incorporated herein in their entirety.

TECHNICAL FIELD

The exemplary embodiments of this invention relate generally to UTRAN long term evolution often referred as 3.9G, and more specifically, relate to signaling in response to UL/DL resource allocations.

BACKGROUND

The following abbreviations are utilized herein:
3GPP third generation partnership project
ACK acknowledgement
A/N ACK/NACK
ARQ automatic repeat-request
AT allocation table
BS base station
CAZAC constant amplitude zero autocorrelation
CDM code division multiplexing
CQI channel quality indicator
CRC cyclic redundancy check
DFT discrete Fourier transform
DL downlink (Node B to UE)
DTX discontinuous transmission
E-UTRAN evolved UMTS terrestrial radio access network
eNodeB enhanced Node-B
FDD frequency division duplex
HARQ hybrid automatic repeat-request
I/Q inverse/quadrature
L1 layer 1 (physical layer, PHY)
LTE long term evolution of UTRAN
MIMO multiple input/multiple output
NACK negative acknowledgement
PDCCH physical downlink control channel
PDSCH physical downlink shared channel
PRB physical resource block
PUSCH physical uplink shared channel
Node B base station
OFDM orthogonal frequency division multiplexed
OFDMA orthogonal frequency division multiple access
PMI pre-coding matrix indicator
PRB physical resource block
PUSCH physical uplink shared channel
RLC radio link control
RS reference signal
SINR signal to interference-plus-noise ratio
SNR signal to noise ratio
TDD time division duplex
TDM time division multiplexed
TTI transmission time interval
UE user equipment, such as a mobile station or mobile terminal
UL uplink (UE to Node B)
UMTS universal mobile telecommunications system
UTRAN UMTS terrestrial radio access network A proposed communication system known as E-UTRAN or LTE is currently under discussion within the 3GPP. The E-UTRAN or LTE system is a packet-based system that operates under strict control of the BS (Node B). The usage of physical UL/DL resources is signaled from the eNodeB to the UE, typically on a TTI per TTI time scale. The signaling is realized by use of UL and DL ATs (also termed PDCCHs). The UL and DL ATs indicate to the UE which physical resources are assigned for UL and DL data transmissions, respectively. When data transmission occurs over a wireless medium, there is a risk of error when receiving and detecting the data.

From the point of view of the UL, there are a number of potential signaling error events related to DL resource allocation:

(1) The reception of DL allocation grant fails (i.e. only the DL allocation was sent).
(2) Both UL and DL allocations fail.
(3) The DL allocation grant fails but the UL allocation grant does not.

A working assumption in the 3GPP is that UL and DL allocation tables are separately encoded (e.g., error (3)). Error (2) may occur, for example, in the situation where the UL and DL ATs are jointly coded. Similarly, error (2) can occur when uplink and downlink allocation tables are separately coded, and both fail simultaneously. The error rate related to the resource allocation signaling is assumed to be on the order of 1%-5%.

Note that the ACK/NACK caused by the DL AT and the UL data allocation caused by UL AT will probably be associated to different TTIs. This is due to the fact that ACK/NACK signaling cannot be transmitted until the corresponding DL data packet has been decoded. This is in contrast to the UL data since the UL data can be transmitted immediately once the UL AT has been correctly received.

It is also possible for the UE to decode the DL control channel but the CRC check fails (i.e., there was a recourse allocation for the given UE but it cannot be utilized).

In Layer 1 specifications of 3GPP LTE standardization (e.g., TS 36.211, 36.212 and 36.213) are discussed multiple HARQ-ACK transmission in PUSCH for TDD mode of LTE system. There are some differences between TDD and FDD modes regarding to control signalling in general. In the FDD mode, each DL sub-frame has a dedicated UL sub-frame to be used to transmit DL related L1/L2 control signals such as ACK/NACK. In the TDD mode, a single UL sub-frame needs to support signalling of L1/L2 control signals from multiple DL sub-frames. The number of DL sub-frames associated with a single UL sub-frame depends on the DL-UL ratio, which is configured by the eNodeB (e.g., broadcasted in system information). Clearly the more dynamic TDD mode is more difficult.

Two different approaches have been discussed in 3GPP regarding to the ACK/NACK signalling in TDD mode. One is termed ACK/NACK bundling, in which ACK/NACK feedback related to multiple DL sub-frames is compressed into a single ACK/NACK feedback transmitted via a single ACK/NACK resource. The other is termed Multi-ACK/NACK (also known as ACK/NACK multiplexing), in which each DL sub-frame is considered as a separate HARQ process. A separate ACK/NACK feedback is transmitted for each (granted) DL sub-frame. Specification work related to ACK/NACK bundling is almost completed. The multi-ACK/NACK scheme is currently approaching the final agreement pending from the exact HARQ-ACK/NACK feedback information in LTE Rel. 8 specifications.

The 3GPP specification at the time of this invention does not support explicit DTX detection for ACK/NACK over the PUSCH in LTE TDD, or to the extent one may consider that it does, it does so with high signaling overhead. LTE as currently understood may be considered to support explicit DTX detection for ACK/NACK over PUSCH because each HARQ process could use a 3-state feedback. This represents a high overhead for explicit DTX detection because it would require K bits instead of N bits for the 3-state feedback, where K=ceil(log 2(3^N). Taking specific examples to illustrate the overhead increase, for N=2 then K=4; for N=3 then K=5; for N=4 then K=7; etc. Though this does provide the full information/capability for the eNodeB to identify the explicit DTX state, it requires from 66.7% to 100% more signaling overhead (either 2 to 3 additional bits) to have such explicit DTX detection. On the other hand, if e.g. the last consecutive subframe(s) are missed by the UE, there is a risk that the eNodeB may wrongly decode the HARQ-ACK/NACK feedback from all detected DL assignments due to the wrong encoding of HARQ, and so therefore the UE may have to always encode the HARQ-ACK 3-state feedback based on the "worse" case, i.e. N always equal to the number of associated DL subframes per PUSCH regardless of how many DL subframes are actually scheduled. Thus to support explicit DTX signaling, LTE currently would have each DL HARQ process use a 3-state feedback (ACK, NACK and DTX), and the number of required signaling bits would be K=ceil(log 2(3^N)).

Consider an example. In the case of 4DL subframes being associated with 1UL subframe, if the eNodeB scheduled 3 DL subframes to one UE and the UE missed the last DL AT (assignment), instead of encoding the HARQ-ACK from 3 subframes the UE will encode the HARQ-ACK from 2 subframes, while the eNodeB is trying to decode the HARQ-ACK assuming it was encoded from 3 subframes thus can not correctly decode anything because of the eNodeB's wrong assumption about the encoding. This comes from the reason that in current LTE TDD Rel8 specifications the UE can not detect the missed last consecutive DL assignments, i.e. the UE assumes that there is not a DL assignment sent if those missed DL assignments are from the last consecutive ones. But the UE can detect the missed DL assignments if not being the last consecutive ones, thus the DTX state can be generated for those missed DL assignment. To solve such mis-matched encoding and decoding, the UE has to encode the HARQ-ACK of 4 DL subframes always with 3 state feedback per DL subframe. This means that the encoded feedback is always 7-bits (from 4 DL subframes with 3-state from each), regardless of the actual number of DL assignment, e.g. with 1, 2, 3 or 4 DL assignment the number of required feedback bits are 2, 4, 5 or 7 for 3-state feedback per DL assignment or 1, 2, 3 or 4 bits for 2-state feedback per DL assignment. Apparently, the signaling overhead is huge, up to 600% (in the case of 1 DL assignment was sent by the eNodeB but the UE encodes a 7-bits feedback). Certain teachings herein according to the second aspect of the invention detail how to improve upon this high overhead.

SUMMARY

In an exemplary aspect of the invention, there is a method comprising receiving scheduling information, determining that at least one downlink allocation of the scheduling information was not received, sending a reply to the received scheduling that comprises an indication of discontinuous transmission in response to the determining.

In another exemplary aspect of the invention there is an apparatus comprising a receiver, a transmitter, the receiver configured to receive scheduling information, a processor configured to determine that at least one downlink allocation of the scheduling information was not received, the transmitter configured to send a reply to the received scheduling that comprises an indication of discontinuous transmission in response to the determining.

In still another exemplary aspect of the invention there is a computer readable medium encoded with a computer program executable by a processor to perform actions comprising receiving scheduling information, determining that at least one downlink allocation of the scheduling information was not received, sending a reply to the received scheduling that comprises an indication of discontinuous transmission in response to the determining.

In yet another exemplary aspect of the invention there is an apparatus comprising means for receiving scheduling information, means for determining that at least one downlink allocation of the scheduling information was not received, means for sending a reply to the received scheduling that comprises an indication of discontinuous transmission in response to the determining.

In accordance with an exemplary aspect of the invention as stated above, the means for receiving comprises a receiver, the means for determining comprises a processor, and the means for sending comprises a transmitter.

In another exemplary aspect of the invention there is a method comprising sending scheduling information, and receiving a reply to the scheduling information comprising an indication of discontinuous transmission that at least one downlink allocation of the scheduling information was not received.

In another exemplary aspect of the invention there is an apparatus comprising a receiver, a transmitter, the transmitter configured to send scheduling information, and the receiver configured to receive a reply to the scheduling information comprising an indication of discontinuous transmission that at least one downlink allocation of the scheduling information was not received.

In still another exemplary aspect of the invention there is a computer readable medium encoded with a computer program executable by a processor to perform actions comprising sending scheduling information, and receiving a reply to the scheduling information comprising an indication of discontinuous transmission that at least one downlink allocation of the scheduling information was not received.

In yet another exemplary aspect of the invention there is an apparatus comprising means for sending scheduling information, and means for receiving a reply to the scheduling information comprising an indication of discontinuous transmission that at least one downlink allocation of the scheduling information was not received.

In accordance with an exemplary aspect of the invention as stated above, the means for sending comprises a transmitter and the means for receiving comprises a receiver

BRIEF DESCRIPTION OF THE DRAWINGS

The foregoing and other aspects of embodiments of this invention are made more evident in the following Detailed Description, when read in conjunction with the attached Drawing Figures, wherein:

FIGS. 5A-5C illustrate lookup tables to be stored locally at the UE and eNodeB for use in mapping multi-ACK/NACK indications according to exemplary embodiments of the second aspect of the invention;

DETAILED DESCRIPTION

Figure 1B:
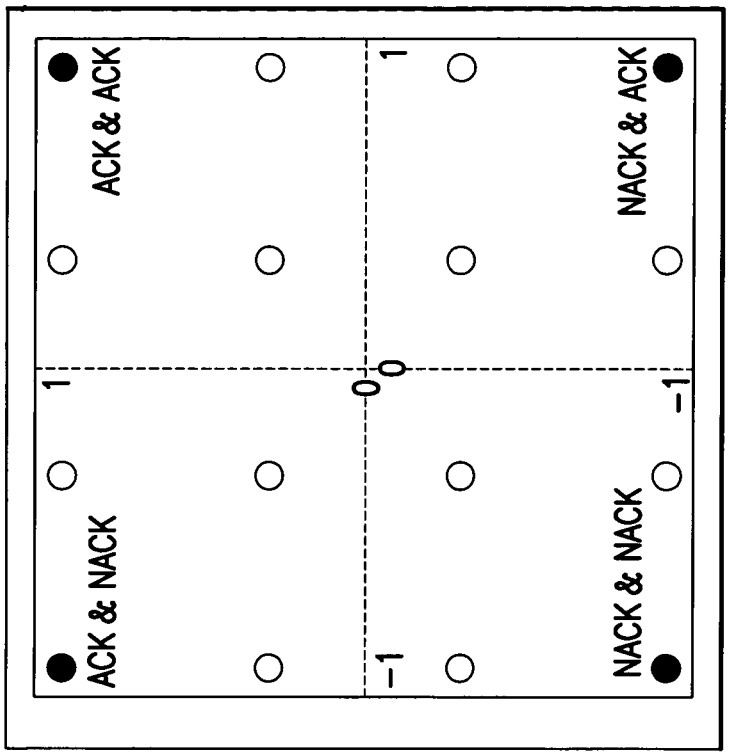
FIG. 1 illustrates an agreed structure for transmitting a 1-bit (1A) and 2-bit (1B) ACK/NACK with data.

VoIP is an example of an application which can use persistent allocation. In persistent allocation the UL resources are allocated persistently to the UE and thereby UL allocation grants are not sent. Both persistent and non-persistent cases are considered in various exemplary aspects of the invention, which consider UL signaling of ACK/NACK or DTX. Presented herein as a first aspect of the invention is an efficient signaling format for three-stage UL control signaling (ACK/NACK/DTX) compatible with the LTE UL specification at the time of this invention. In a second aspect of the invention there is a DTX-bit transmitted from the UE to the eNodeB to support explicit DTX detection for PUSCH ACK/NACK in combination with feedback HARQ-ACK/NACK only for scheduled DL subframes whenever a UL grant is available.

First is detailed the first aspect of the invention. In a case when the reception of the DL allocation fails a problem arises where the UE misses the DL allocation so it cannot include the ACK/NACK into the UL transmission. The eNodeB does not know the ACK/NACK is missing and decodes the UL transmission assuming the ACK/NACK is there. This leads to an erroneous reception of the UL transmission such as data and/or possibly CQI+MIMO feedback.

In the case when the UE has an UL allocation, i.e. it is scheduled to transmit data on a PUSCH, the problem can be solved by including in the UL grant and/or in the DL grant, a bit (or bits) which indicates whether the corresponding DL was also transmitted or not. This is similarly discussed in a commonly owned application 60/919,048. Further, said application also discusses that in case of DL allocation grant failure, it is possible to implement explicit DTX signaling just by transmitting nothing (i.e., DTX) in the case of DL allocation grant failure. The problem of this approach is that there may be implications regarding the RAN4 requirements related to average transmit power and power amplifier related issues. This is due to the fact that, if DTX takes place, UE transmitter needs to be switched on/off during a certain block containing DTX and UL data.

An advantage of the proposed solution is that it does not require a UE to switch off power when "signaling" DTX/ rather than ACK or NACK.

However, there are cases when the UE does not receive uplink grants for data transmission on PUSCH such as the persistent allocation in the case of e.g. VoIP users. In these scenarios it is equally important to be able to make sure DTX (discontinuous transmission of ACK/NACK) is not interpreted as ACK/NACK. Similar problems occur also when the UE transmits only control signaling on the PUCCH.

The commonly owned application 60/919,048 can be seen to disclose a solution for the cases where:

UE transmits nothing (i.e., DTX) in the case of DL allocation grant failure. This approach has some problems with RAN4 requirements (see previous paragraphs).

UE can transmit always NACK, in case that it does not receive the DL grant properly. Problem of this approach is that eNode-B does not have capability to detect the DL allocation grant failure by means of DTX detection. It is noted that this approach may also degrade PUSCH performance because the UE may not be able to distinguish between the case that an eNB did transmit a DL grant but UE missed and the case that nothing has been transmitted by eNB nor received by UE, therefore UE may puncture the PUSCH unnecessarily and cause PUSCH decoding corruption in the extreme situation.

There is a concern for addressing persistent allocation, i.e., the case when UL grant is not transmitted. However, there have been some discussions to reserve always a certain predefined bit-field for ACK/NACK purpose with persistent UEs. In case of DL allocation grant failure, UE could now transmit NACK or nothing (i.e., DTX) using this bit-field. Problems of these approaches are the same as with non-persistent cases discussed above.

It was confirmed in the 3GPP meeting RAN1#50 in Athens that:

For ACK/NACK, the coding, scrambling and modulation should maximize the Euclidean distance.

For ACK/NACK (in case of FDD), a modulation symbol used for control signaling carries at most 2 bits of coded control information regardless of PUSCH modulation scheme.

Figure 1A:
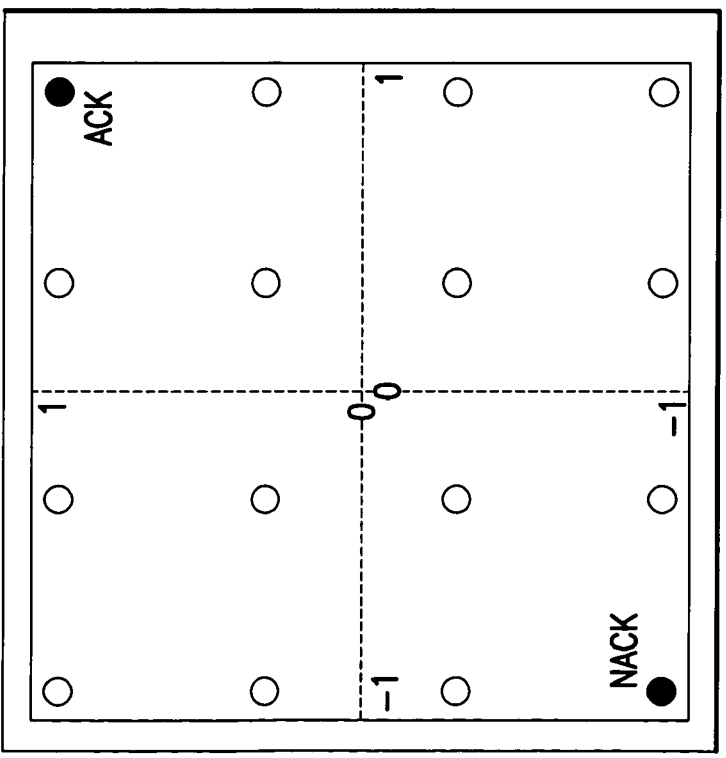

The principle is depicted in the FIG. 1, though the exact mapping of ACK and NACK symbols may be different from what is shown there. FIG. 1 illustrates the agreed structure for transmitting a 1-bit (1A) and 2-bit (1B) ACK/NACK with data.

Furthermore, it was decided that the data and control signaling will occur in both slots of the sub-frame. As a result, there will always be an even number of ACK/NACK symbols in a sub-frame.

According to an embodiment of this first aspect of the invention there is included a third possible logical stage into the modulation pattern, DTX; i.e. the UE will explicitly signal DTX if it has not received a DL grant and thus does not transmit an ACK or a NACK.

The signaling can be easily realized utilizing the agreed modulation structure. The DTX shall be signaled in an embodiment of this first aspect of the invention so that:

In the case of explicit ACK/NACK DTX signaling the ACK/NACK symbols are replaced by DTX symbols The DTX symbols appear in pairs. Each pair corresponds to two constellation points.

Figure 2B:
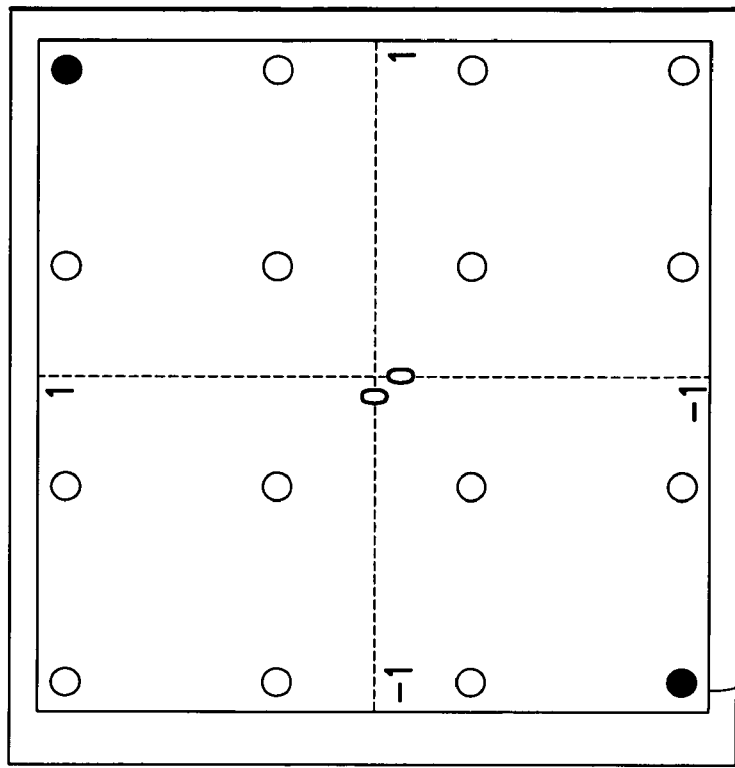
FIG. 2 illustrates an exemplary structure for transmitting an explicit DTX with the 1 or 2 bit ACK/NACK structure.
Figure 2A:
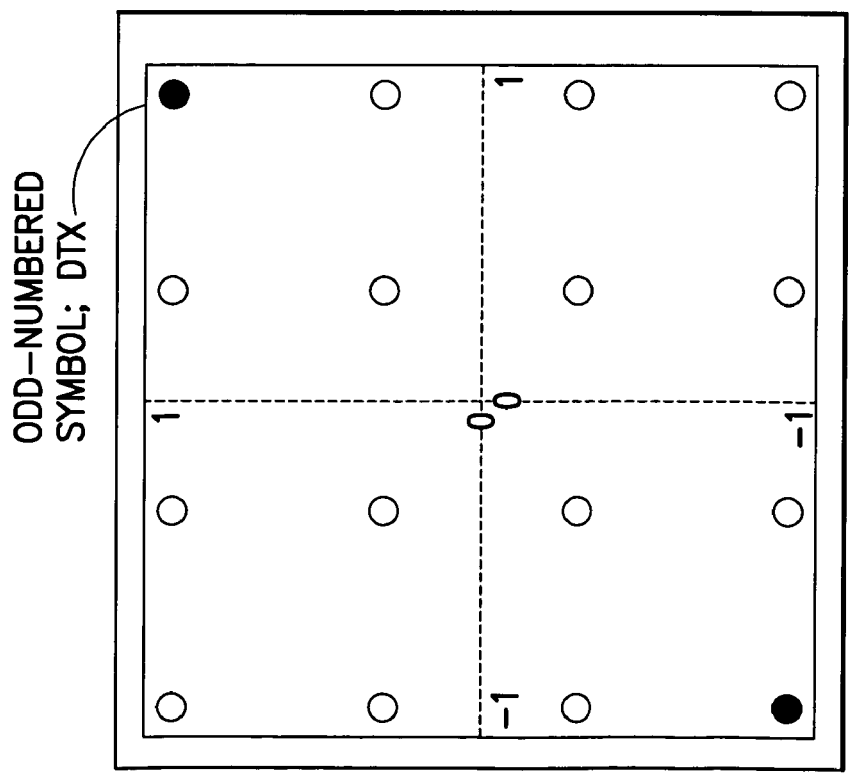

The constellation points in the pairs are placed symmetrically to the opposite sides of the center of the IQ-diagram. An example of the proposed symbol alignment scheme according to this first aspect of the invention is illustrated in FIG. 2. The idea is that in the case when the DTX is transmitted, every other symbol would use the constellation points reserved for ACK while the rest of the symbols would use constellation points reserved for NACK. At the receiver the points are then added together and as a result for the DTX points the sum will be close to zero. Thus it is easy to make a three-state decision of whether ACK, NACK or DTX was transmitted. It is noted that the above mentioned arrangement can also be described as a Hadamard-spreading code selection (called also as Hadamard-scrambling code selection) applied to the ACK/NACK symbols such as:

ACK: ACK symbol is spread by Hadamard code of [1, 1]

NACK: NACK symbol is spread by Hadamard code of [1, 1]

DTX: NACK symbol is spread by Hadamard code of [1,-1] or in this example, the usage of spreading sequence selection enables to separate NACK and DTX.

For the two-bit ACK/NACK operation (the MIMO-case) for this first aspect of the invention, a similar principle can be applied. Now, in the case of DTX every other symbol uses the constellation point reserved for e.g. ACK & ACK and the rest of the symbols the points reserved for NACK & NACK. Alternatively, constellation points corresponding to the ACK&NACK and NACK&ACK can be selected in case of DTX.

This arrangement can be seen also as Hadamard-spreading of ACK/NACK constellation:

ACK & ACK: ACK &ACK symbol spread by Hadamard code of [1, 1]

ACK & NACK: ACK & NACK symbol spread by Hadamard code of [1, 1]

NACK & ACK: NACK &ACK symbol is spread by Hadamard code of [1, 1]

DTX: NACK & NACK symbol is spread by Hadamard code of [1, −1].

FIG. 2 illustrates an exemplary structure for transmitting an explicit DTX with the 1 or 2 bit ACK/NACK structure. In every other (e.g. odd) symbol the constellation point at the upper right corner of FIG. 2 (designated as 2A) is transmitted. In the rest of the symbols (even) the point at the lower left corner of FIG. 2 (designated 2B) is transmitted.

In other words, with a one-bit ACK/NACK structure the DTX transmission can be realized transmitting a pattern:

NACK-ACK-NACK-ACK-NACK-ACK . . .

Similarly in the two-bit ACK/NACK case the transmission pattern would be:

NACK&NACK-ACK&ACK-NACK&NACK-ACK&ACK-NACK&NACK-ACK&ACK . . .

It is noted that the invention is not limited to the case where the DTX signal consists of only one signaling bit (as discussed in the given example). For example, in TDD application there can be more than one signaling bit reserved/used for DTX signaling. In this case longer spreading sequences can be used, such as for example length-four Hadamard codes.

It is noted that within the scope of this invention, the proposed scheme is not limited to DTX signaling only. The information conveyed via spreading sequence selection applied to ACK/NACK symbols can be for example additional ACK/NACK bits of multi-bits ACK/NACK in TDD.

Regarding implementation of an exemplary embodiment of the first aspect of the invention in the case where the UE does not receive an UL grant due to e.g. persistent allocation it replaces the symbols reserved for ACK/NACK by the DTX symbols as explained previously. As the eNodeB knows which symbols are reserved for ACK/NACK/DTX it can easily decode the transmitted symbols by adding them together by doing e.g. maximum ratio combining or summing the soft bits together. After this the three state decision of what was transmitted by the UE (ACK/NACK/DTX) is straight-forward. By adjusting the power threshold between the ACK and *DTX the possibility of interpreting DTX as ACK can be minimized.

As can be seen, an advantage of this first aspect of the invention is at least that the UL data/control signaling will not be interpreted as an ACK/NACK even in case when the UE fails to decode the DL allocation grant correctly and there is no UL allocation grant available. Such a misinterpretation would be a serious error case from the eNodeB point of view.

Further, technical effects of certain embodiments of the first aspect of the invention helps in efficiently mitigating the below mentioned error cases:

When UL data or CQI is interpreted as ACK, as a transmission is erroneously assumed to be OK, higher layers will have to detect this and provide means to recover (much slower recovery than L1 recovery; such error cases should only happen with an extremely low probability, much lower than the above mentioned 1%-5%).

Where the reception of UL data may also fail. While ARQ will eventually cure this, there may be a more serious issue with HARQ called soft buffer corruption: For HARQ the initial packet is not discarded if it cannot be decoded but the data will be combined with subsequent packets. If the first packed was received (or interpreted) inconsistent, this will harm also the subsequent decoding.

Where in the case the reception of CQI may also fail.

Another technical effect of the first aspect of the invention can be seen whereas the constant number of symbols is allocated for ACK/NACK/DTX in spite of the presence of ACK/NACK the number of symbols for data and/or the CQI (+MiMO feedback) is constant. The exemplary embodiments of the invention herein simplifies multiplexing and may also eliminate the need for blind decoding in the eNodeB.

As mentioned, a straightforward way of implementing explicit DTX for ACK/NACK would be just to transmit nothing in the case of DTX. However, this may have some implications regarding the RAN4 requirements related to average transmit power and power amplifier related issues. Using the method of the first aspect of the invention these problems can be avoided.

As may be seen as a disadvantage, it may not be possible to utilize the symbols reserved for ACK/NACK for other purposes (data or CQI) even when there is no need to send ACK/NACK. This may result in slight increase of UL overhead in some cases. However, this overhead is minimized if a signaling bit indicating the need for simultaneous ACK/NACK transmission is included in the UL allocation grant signaling.

Figure 3:
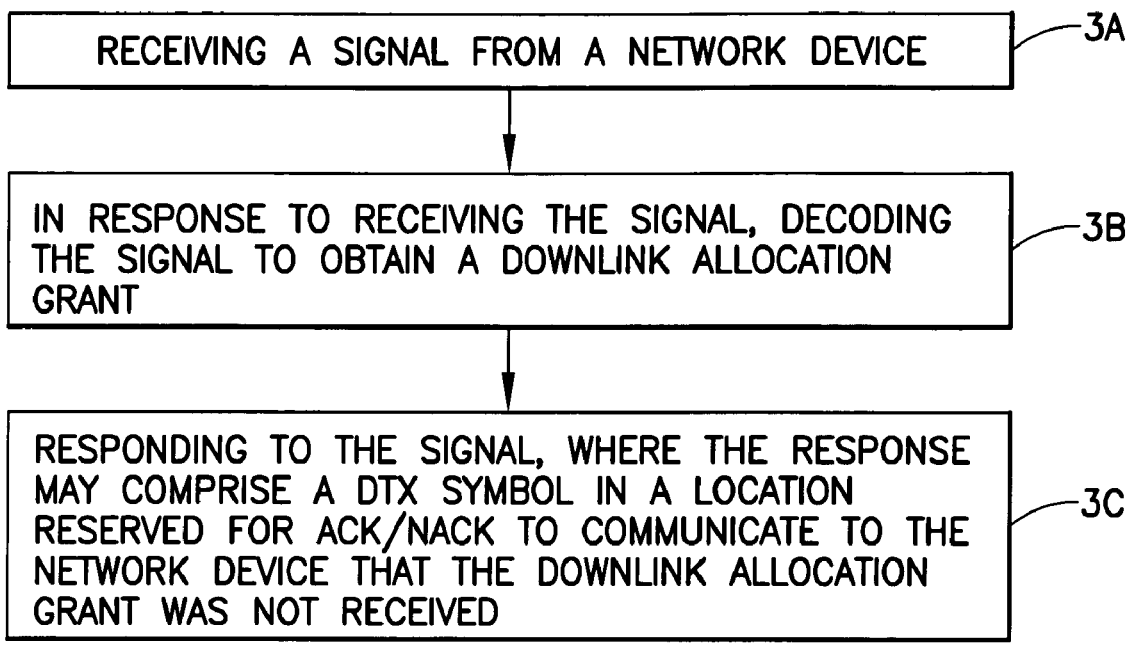
FIG. 3 depicts a flow chart illustrating one non-limiting example of a method in accordance with an exemplary embodiment of a first aspect of the invention.

In one non-limiting, exemplary embodiment according to the first aspect of the invention, and as illustrated in FIG. 3, there is provided a method, apparatus, and computer program embodied on a computer readable memory and executable by a digital processor, of the user equipment for example, comprising receiving a signal from a network device (3A), in response to receiving the signal, decoding the signal to obtain a downlink allocation grant (3B), and responding to the signal, where the response may comprise a DTX symbol in a location reserved for ACK/NACK to communicate to the network device that the downlink allocation grant was not received (3C).

Figure 4:
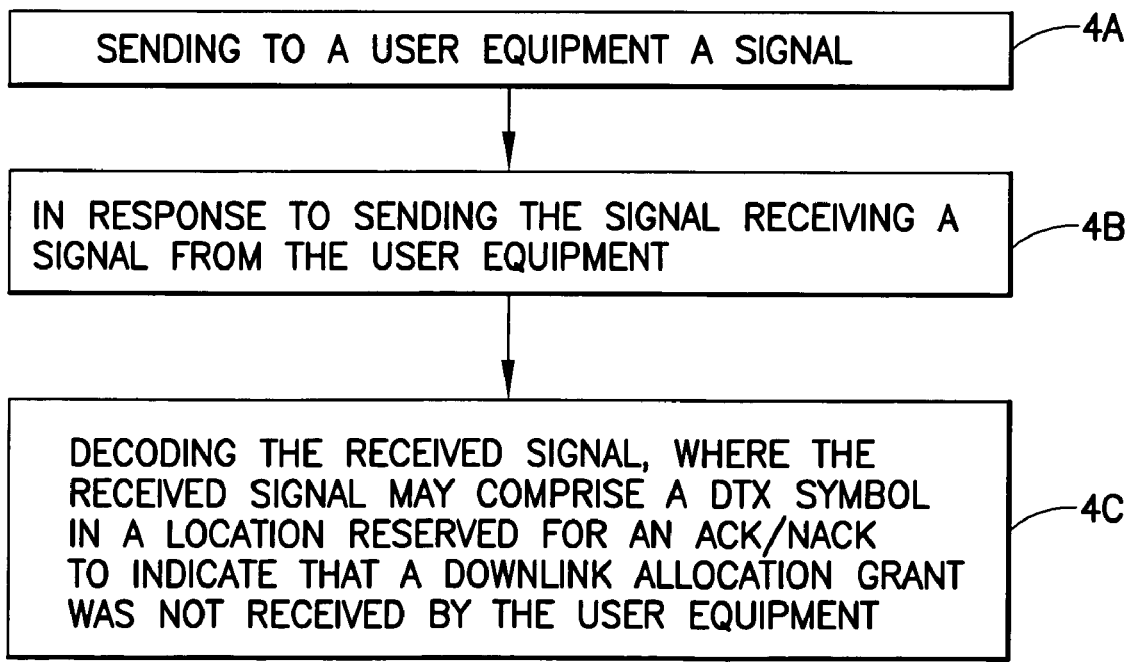
FIG. 4 depicts a flow chart illustrating another non-limiting example of a method in accordance with an exemplary embodiment of a first aspect of the invention.

In an additional non-limiting embodiment according to the first aspect of the invention, and as illustrated in FIG. 4, there is a method, apparatus, and computer program embodied on a computer readable memory and executable by a digital processor for, of the network device for example, comprising sending to a user equipment a signal (4A), in response to sending the signal receiving a signal from the user equipment (4B), and decoding the received signal, where the received signal may comprise a DTX symbol in a location reserved for an ACK/NACK to indicate that a downlink allocation grant was not received by the user equipment (4C).

Now are described particular embodiments according to the second aspect of the invention. Explicit DTX detection from the receiver (eNodeB) is beneficial for HARQ performance, e.g. if the eNodeB sends the AT/PDCCH and the UE does not receive it, the UE will not send an ACK/NACK. If that is interpreted by the eNodeB as a NACK, then the eNodeB will retransmit. The UE will be able to notice that NDI (i.e. New Data Indicator, which indicate the assigned data packet is a new one from previous assignment) has changed and will not combine the retransmission with an earlier transmission. Due to potentially missing systematic bits, the UE will most probably not decode the PDSCH correctly. This will increase the HARQ re-transmissions, and thereby decrease the system performance through increased delay and reduced overall data throughput rate. Additionally, explicit DTX detection from the eNodeB is also beneficial for the packet scheduler flexibility, e.g. in current transport block size (TBS) design as set forth at 3GPP TS 36.213 (v8.3.0, 2008-05; particularly sec. 7 and table 7.1.7.1-1 "Modulation and TBS Index Table for PDSCH"), there are 32 TBS indices for each allocated number of PRB, in which the indices 0-28 are each associated with a TBS value and a modulation scheme, and indices 29-31 are each associated with a particular modulation (i.e. 29th for QPSK, 30th for 16QAM and 31th for 64QAM). For new transmissions, only TBS indices 0-28 can be used so that UE can derive the TBS value by looking for the TBS table with jointly TBS index and number of allocated PRB. But for retransmissions, the eNodeB can use TBS indices 29-31 while both the eNodeB and the UE can assume that the TBS value is not changed from the first transmission. The benefit of doing so is that the eNodeB can change the number of allocated PRBs from the first transmission without the impact on PUSCH or PDSCH soft-combing and decoding.

Embodiments according to this second aspect of the invention provide the technical effect of a cost-efficient DTX signaling arrangement to be used with multi-bits ACK/NACK on the PUSCH.

In an embodiment according to the second aspect of the invention, the UE transmits just a single DTX bit in the multi-bits ACK/NACK message. In one particular embodiment according to this second aspect, this 1-bit may be jointly encoded. In another particular embodiment according to this second aspect, this 1-bit may be separately encoded with the multiple ACK/NACK feedback bits, such as for example by selecting a different scrambling sequence, or by using a different codebook, or different ACK/NACK constellation points, etc.

Behind the "DTX"-bit there are bit-mapping or logical operations that are a priori understood by both the UE and the eNodeB (e.g., defined by the specification). The below examples for how the DTX bit is interpreted are arbitrary and may be reversed as indicated by the parentheses.

If the DTX bit is set to 1 (or alternatively 0), this indicates that at least one grant that was sent to the UE in the single PDCCH/AT being ACK'd/NACK'd has been missed by the UE. The result is that at the receiver side (e.g., the eNodeB), all of the NACK's in that multi ACK/NACK message sent in response to the single PDCCH/AT are considered as potentially failed grants.

If the DTX bit is set to 0 (or alternatively 1), this indicates that none of the grants sent to the UE in the single PDCCH/AT being ACK'd/NACK'd has been missed by the UE. The result is that at the receiver side (e.g., the eNodeB), all of the NACK's in that multi ACK/NACK message are considered as "true" NACK's (e.g., that all grants in that PDCCH have been successfully received by the UE).

In another particular embodiment according to this second aspect of the invention, the UE may only encode the HARQ 2-states (ACK or NACK) feedback from those scheduled DL subframes. This is achieved by comparing the downlink assignment index (DAI) in the UL grant to the DAI (as a pure counter) in DL grant, by which the UE can identify any missed DL assignment and its position among all transmitted DL assignments. If the UE finds some of the DL assignments are missed, the UE will select a "NACK" state to report for it, and the DTX-bit will overall look after the explicit DTX detection for all scheduled DL subframes. It is noted that the LTE specifications do not yet mandate that there be a DAI in the UL grant as the above particular embodiment assumes, but that change may be made to the LTE specifications also so that both UE and eNodeB understand the meaning of the DAI without additional control singling.

FIGS. 5A-5C show exemplary embodiments as to how such a DTX bit might be implemented for HARQ-ACK feedback from 2, 3 or 4 DL assignments, respectively, and depending on the actually transmitted DL assignments from the eNodeB. The rightmost column is the DTX-bit indicating whether there is at least one DL assignment was missed at UE side. And the interior two, three or four columns give the exemplary encoding for 2-state HARQ-ACK feedback from two, three or four eNodeB transmitted DL assignments in the PDCCH/AT. The coding bits are what is sent in the multi-bit ACK/NACK message. As can be seen from the number of downlink assignments being ACK'd/NACK'd, this technique demonstrated at FIGS. 5A-5C adds but a single bit to the overall signaling.

Figure 6:
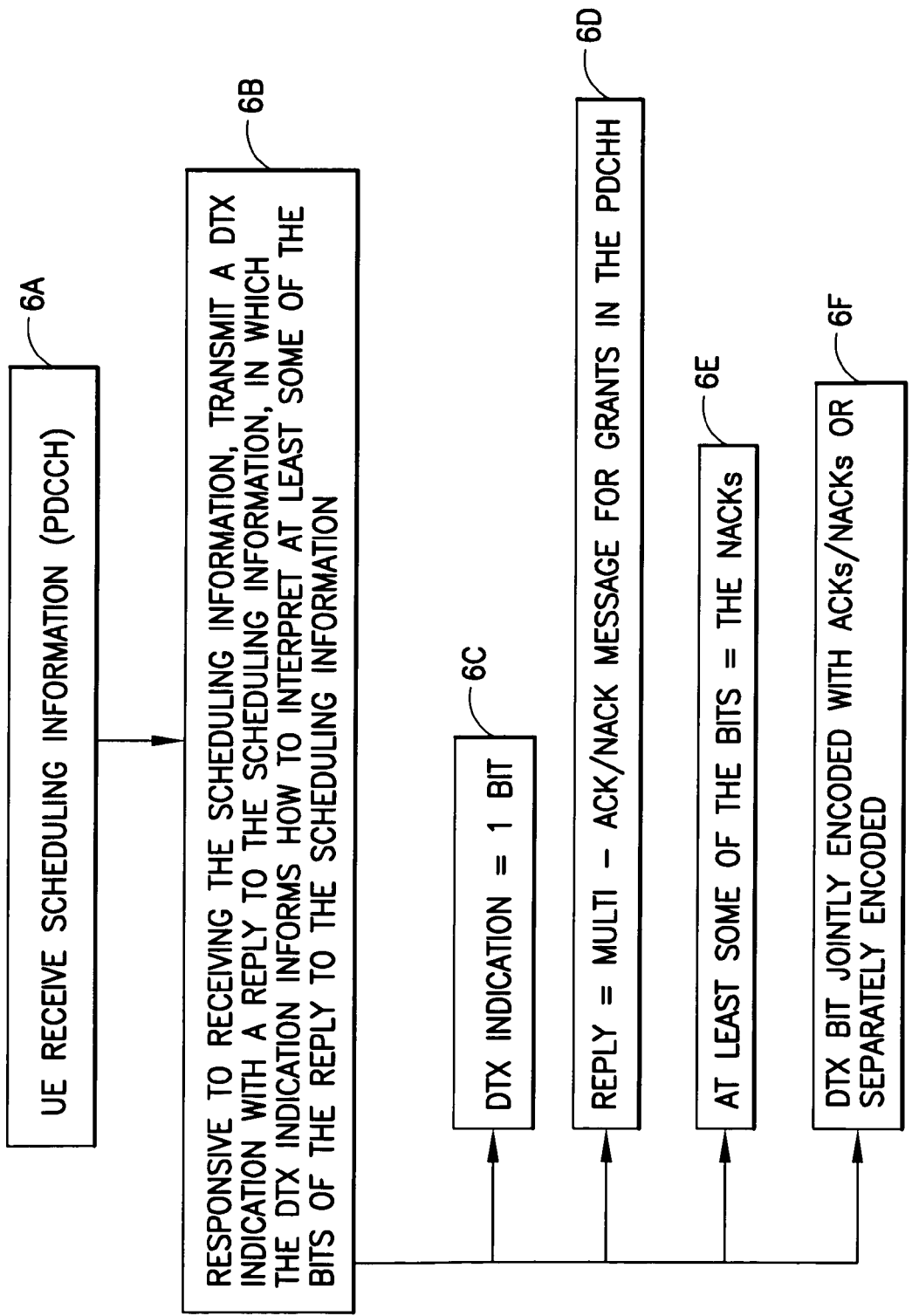
FIG. 6 is a non-limiting and exemplary process flow diagram from the perspective of the UE for signaling in accordance with an exemplary embodiment of the second aspect of the invention.

FIG. 6 is an exemplary process flow diagram from the perspective of the UE according to this second aspect of the invention. At block 6A the UE receives scheduling information (e.g., receives the PDCCH), and at block 6B, responsive to receiving the scheduling information at block 6A, the UE transmits a discontinuous transmission DTX indication with the UE's reply to the scheduling information. The DTX indication is characterized in that it informs how to interpret at least some of the bits of the reply to the scheduling information. The remainder of FIG. 6 shows some implementation details and specifics that may be combined individually or in any pair or group with blocks 6A-6B. At block 6C the DTX indication is restricted to be one bit, at block 6D the reply is a multi-ACK/NACK message for grants in the PDCCH, at block 6E the "at least some of the bits" are restricted to be only the NACKs of the multi-ACK/NACK message, and at block 6F in one embodiment the UE jointly encodes the DTX bit with the ACKs/NACKs, and in another embodiment the UE encodes the DTX bit separately from the ACKs/NACKs of the same message.

Figure 7:
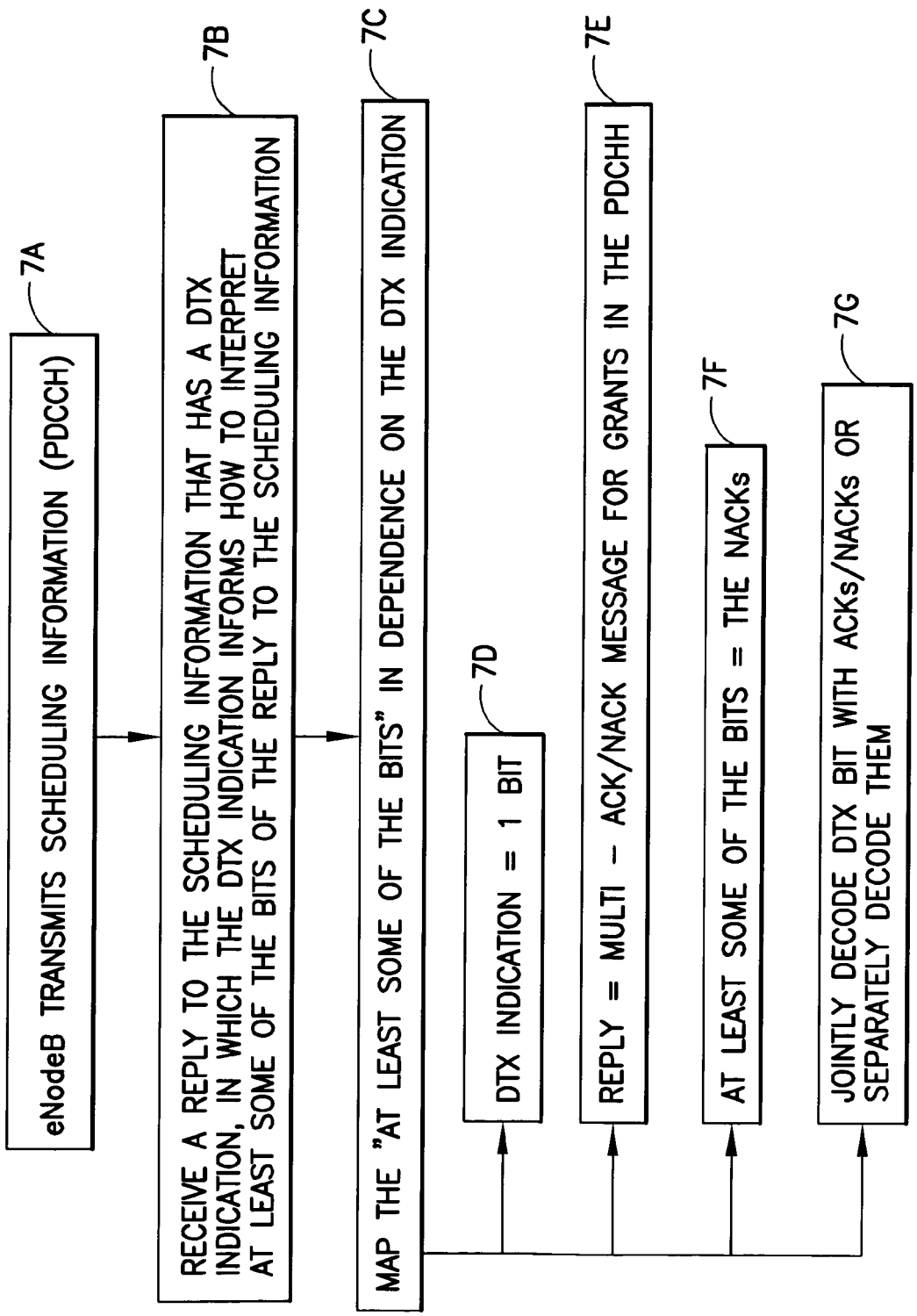
FIG. 7 is a non-limiting and exemplary process flow diagram from the perspective of the eNodeB for signaling in accordance with an exemplary embodiment of the second aspect of the invention.

FIG. 7 is an exemplary process flow diagram from the perspective of the eNodeB or other access node according to this second aspect of the invention. At block 7A the eNodeB transmits scheduling information (e.g., PDCCH). At block 7B the eNodeB receives a reply to the scheduling information in which the reply includes a DTX indication. The DTX indication is characterized in that it informs how to interpret at least some of the bits of the reply to the scheduling information. At block 7C the eNodeB maps the "at least some of the bits" in dependence on the DTX indication. The remainder of FIG. 7 shows some implementation details and specifics that may be combined individually or in any pair or group with blocks 7A-7C. At block 7D the DTX indication is restricted to be one bit, at block 7E the reply is a multi-ACK/NACK message for grants in the PDCCH, at block 7F the "at least some of the bits" are restricted to be only the NACKs of the multi-ACK/NACK message, and at block 7G in one embodiment the eNodeB jointly decodes the DTX bit with the ACKs/NACKs, and in another embodiment the eNodeB decodes the DTX bit separately from the ACKs/NACKs of the same message.

Some performance improvement may be seen at FIG. 1 of "PUSCH Error Case Handling for ACK/NACK Bundling in LTE TDD", 3 GPP TSG RAN WG1 Meeting #54, R1-083091, August 2008 R1-083091 to be presented to the next RAN WG1 meeting (#54bis) in Prague, Czechoslovakia.

From the above description the different interpretations of the NACK bits(s) of the UE's multi-ACK/NACK message that depend on the value of the DTX bit is in one case the NACKs are interpreted as at least one grant which was sent to the UE in the PDCCH that is being NACK'd has been missed by the UE, and in the other case it is interpreted such that all grants in that PDCCH have been successfully received by the UE.

Figure 8:
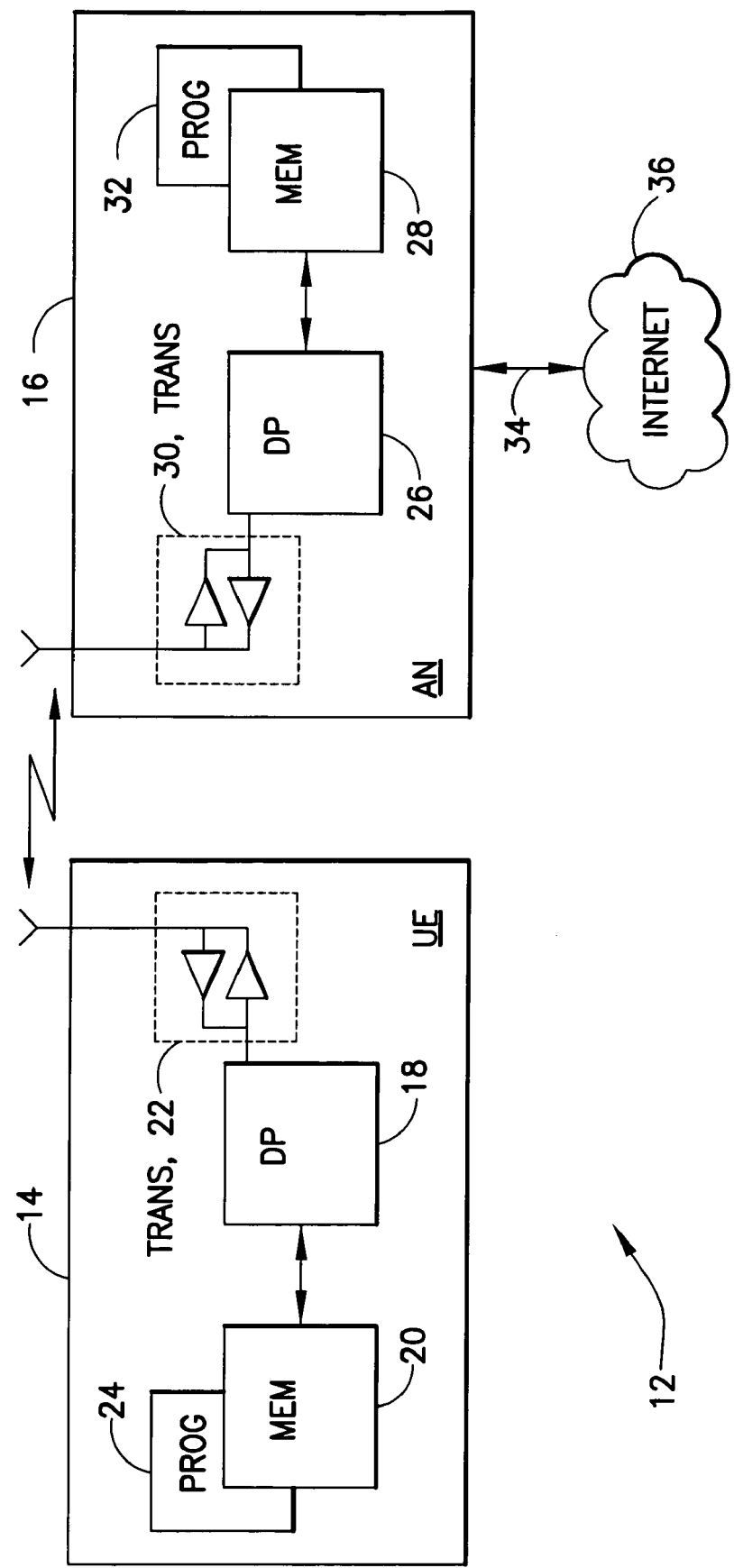
FIG. 8 shows a simplified block diagram of electronic devices that are suitable for use in practicing the exemplary embodiments of the invention.

So certain embodiments according to this second aspect of the invention provide the technical effect of explicit DTX detection capability in the eNodeB with minimum signaling cost; only 1-bit is increased regardless of UL/DL allocation and regardless of the number of fed-back HARQ processes. Another technical effect is that the number of feedback HARQ processes is equal to the number of scheduled DL subframes, instead of equal to the maximum number of DL subframes that could be scheduled. In the worst case scenario according to the second aspect of the invention, the PUSCH ACK/NACK performance may be degraded (e.g. when all DL subframes are scheduled). However, this performance degradation is expected to be rather small and its impact to the system would be more than offset by advantages gained from the technical effects noted above Reference is made to FIG. 8 for illustrating a simplified block diagram of other electronic devices that are suitable for use in practicing the exemplary embodiments of this invention. In FIG. 8, a wireless network 12 is adapted for communication with a user equipment (UE) 14 via an access node (AN) 16. The UE 14 includes a data processor (DP) 18, a memory (MEM) 20 coupled to the DP 18, and a suitable RF transceiver (TRANS) 22 (having a transmitter (TX) and a receiver (RX)) coupled to the DP 18. The MEM 20 stores a program (PROG) 24. The TRANS 22 is for bidirectional wireless communications with the AN 16. Note that the TRANS 22 has at least one antenna to facilitate communication.

The AN 16 includes a data processor (DP) 26, a memory (MEM) 28 coupled to the DP 26, and a suitable RF transceiver (TRANS) 30 (having a transmitter (TX) and a receiver (RX)) coupled to the DP 26. The MEM 28 stores a program (PROG) 32. The TRANS 30 is for bidirectional wireless communications with the UE 14. Note that the TRANS 30 has at least one antenna to facilitate communication. The AN 16 is coupled via a data path 34 to one or more external networks or systems, such as the internet 36, for example.

At least one of the PROGs 24, 32 is assumed to include program instructions that, when executed by the associated DP, enable the electronic device to operate in accordance with the exemplary embodiments of this invention, as discussed herein.

In general, the various embodiments of the UE 14 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The embodiments of this invention may be implemented by computer software executable by one or more of the DPs 18, 26 of the UE 14 and the AN 16, or by hardware, or by a combination of software and hardware.

The MEMs 20, 28 may be of any type suitable to the local technical environment and may be implemented using any suitable data storage technology, such as semiconductor-based memory devices, magnetic memory devices and systems, optical memory devices and systems, fixed memory and removable memory, as non-limiting examples. The DPs 18, 26 may be of any type suitable to the local technical environment, and may include one or more of general purpose computers, special purpose computers, microprocessors, digital signal processors (DSPs) and processors based on a multi-core processor architecture, as non-limiting examples.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

Figure 9:
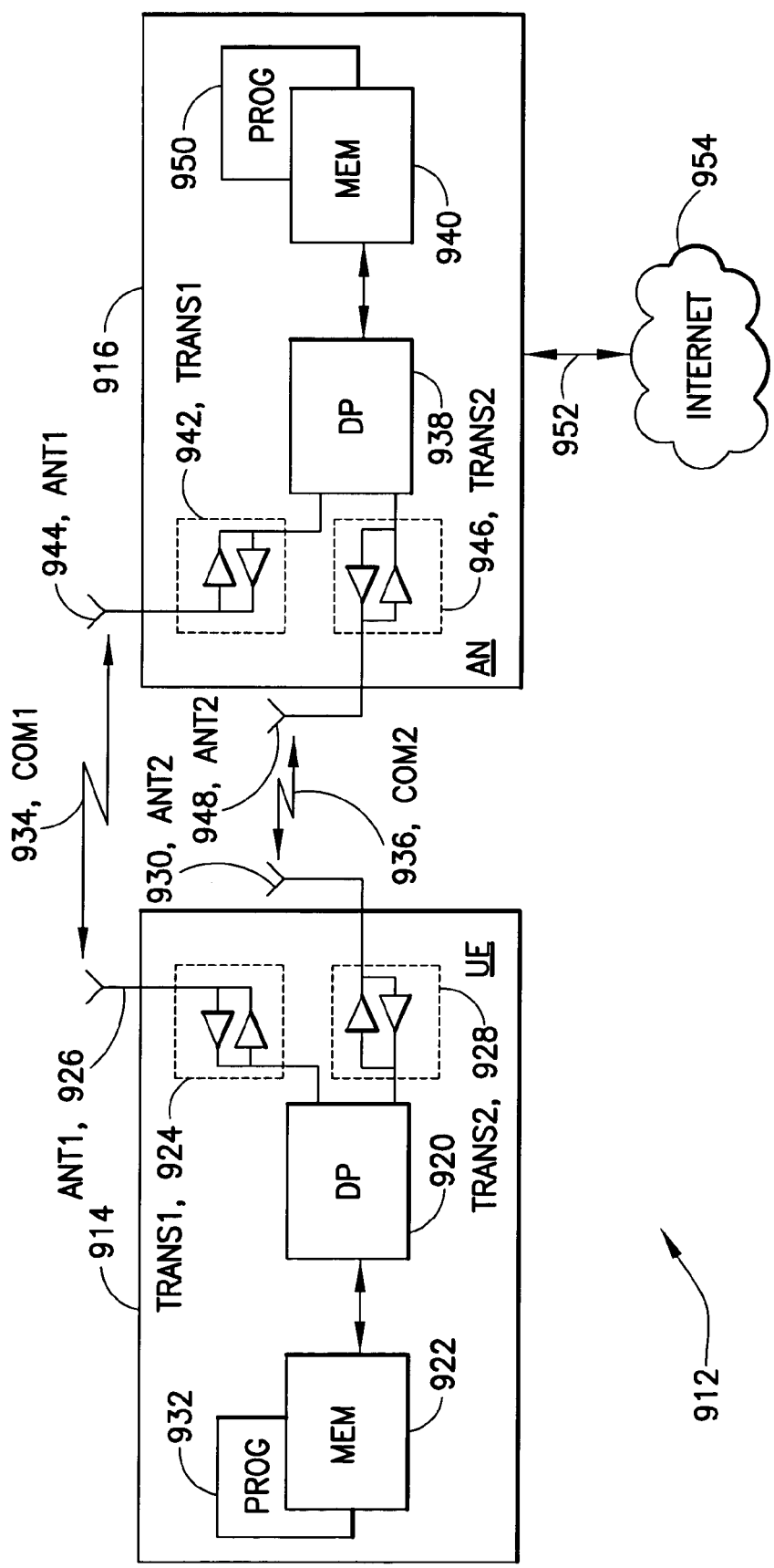
FIG. 9 shows a simplified block diagram of other electronic devices that are suitable for use in practicing the exemplary embodiments of the invention

Reference is made to FIG. 9 for further illustrating in a simplified block diagram various electronic devices that are suitable for use in practicing the exemplary embodiments of this invention. In FIG. 9, a wireless network 912 is adapted for communication with a user equipment (UE) 914 via an access node (AN) 916.

The UE 914 includes: a data processor (DP) 920; a memory (MEM) 922 coupled to the DP 920; a suitable first RF transceiver (TRANS1) 924 (having a transmitter (TX) and a receiver (RX)) coupled to the DP 920; a first antenna (ANT1) 926 coupled to the TRANS1 924; a suitable second RF transceiver (TRANS2) 928 (having a transmitter (TX) and a receiver (RX)) coupled to the DP 920; and a second antenna (ANT2) 930 coupled to the TRANS2 928. The MEM 922 stores a program (PROG) 932. The TRANS1 924 and TRANS2 928 are both capable of bidirectional wireless communication, such as a first communication (COM1) 934 and a second communication (COM2) 936, with the AN 916.

The AN 916 includes: a data processor (DP) 938; a memory (MEM) 940 coupled to the DP 938; a suitable first RF transceiver (TRANS1) 942 (having a transmitter (TX) and a receiver (RX)) coupled to the DP 938; a first antenna (ANT1) 944 coupled to the TRANS1 942; a suitable second RF transceiver (TRANS2) 946 (having a transmitter (TX) and a receiver (RX)) coupled to the DP 938; and a second antenna (ANT2) 948 coupled to the TRANS2 946. The MEM 940 stores a program (PROG) 950. The TRANS1 942 and the TRANS2 946 are both capable of bidirectional wireless communication, such as the COM1 934 and the COM2 936, with the UE 914. The AN 916 may be coupled via a data path 952 to one or more external networks or systems, such as the internet 954, for example.

In some exemplary embodiments, the transceivers 924, 928, 942, 946 and antennas 926, 930, 944, 948 of the UE 914 and AN 916 may be utilized for MIMO communications via COM1 934 and COM2 936.

At least one of the PROGs 932, 950 is assumed to include program instructions that, when executed by the associated DP, enable the electronic device to operate in accordance with the exemplary embodiments of this invention, as discussed herein.

In general, the various embodiments of the UE 914 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The embodiments of this invention may be implemented by computer software executable by one or more of the DPs 920, 938 of the UE 914 and the AN 916, or by hardware, or by a combination of software and hardware.

The MEMs 922, 940 may be of any type suitable to the local technical environment and may be implemented using any suitable data storage technology, such as semiconductor-based memory devices, magnetic memory devices and systems, optical memory devices and systems, fixed memory and removable memory, as non-limiting examples. The DPs 920, 938 may be of any type suitable to the local technical environment, and may include one or more of general purpose computers, special purpose computers, microprocessors, digital signal processors (DSPs) and processors based on a multi-core processor architecture, as non-limiting examples. Embodiments of the invention may be implemented in one or across more than one processor, in which the AN or UE has one processor in a master relation (e.g., general purpose processor) to the other processors which are in a slave relation (e.g., radiofrequency chip, baseband chip, etc.)

Although shown in FIG. 9 as having two transceivers and two antennas, the UE 914 and/or the AN 916 may comprise a different number of transceivers and/or antennas. As a non-limiting example, and as shown in FIG. 8, the UE and AN may each comprise one transceiver and one antenna.

While the exemplary embodiments have been described above in the context of an E-UTRAN (UTRAN-LTE) system, it should be appreciated that the exemplary embodiments of this invention are not limited for use with only this one particular type of wireless communication system, and that they may be used to advantage in other wireless communication systems.

Furthermore, while discussed above primarily with respect to a user equipment and a Node B (base station), it should be appreciated that the exemplary embodiments of the invention are not limited for use with only this one particular type of device, and that they may be used to advantage in other devices. Similarly, while described above with respect to signaling in the uplink and downlink, it should be appreciated that the exemplary embodiments of the invention are not limited for use with only these specific directions or types of signaling, and that they may be used to advantage for different types of signaling in different directions.

In accordance with an exemplary aspect of the invention there is at least a method, apparatus, and executable computer program to perform actions comprising receiving and/or sending scheduling information, determining that at least one downlink allocation of the scheduling information was not received, and sending and/or receiving a reply to the received scheduling information that comprises an indication of discontinuous transmission in response to the determining.

Further, in accordance with the paragraph above the indication comprises at least one discontinuous transmission bit and the reply comprises at least one acknowledge/negative acknowledge bit of a downlink hybrid automatic repeat request process.

In addition, in accordance with any of the above paragraphs each downlink allocation of the scheduling information comprises a separate hybrid automatic repeat request process and the scheduling information may be received on a physical downlink control channel and the reply is sent on a physical uplink shared channel.

Further, in accordance with the previous paragraphs the at least one downlink allocation comprises a persistent allocation or a semi-persistent allocation and the determining can be that at least one downlink allocation of the scheduling information was not received is from an indication in the scheduling information that the at least one downlink allocation was transmitted.

In addition, in accordance with the paragraphs above the indication can comprise a pair or sequence of symbols disposed in the pre-determined symbol position, and the reply can comprise a downlink assignment index that indicates a number of downlink allocations in the scheduling information.

Further, as relates to any of the previous paragraphs the pair or sequence of symbols corresponds to ACK/NACK symbols spread using a pre-determined sequence, the pre-determined sequence can be a Hadamard sequence, the reply can comprise at least one of selection of a spreading sequence, an explicit indication of discontinuous transmission, and both the explicit indication of discontinuous transmission and an acknowledgement of another component of the scheduling information. Further, in accordance with the paragraphs above the reply can comprise at least one of an acknowledgement and a negative acknowledgement of another component of the scheduling information that is jointly encoded and/or decoded with the indication of discontinuous transmission.

Additionally, as relates to the paragraphs above the indication of discontinuous transmission can indicate that at least one downlink allocation of the scheduling information was not received but may not be specific as to which downlink allocation was not received. Further, in accordance with any particular paragraph above determining that at least one downlink allocation of the scheduling information was not received can comprise comparing a downlink assignment index in an uplink scheduling portion of the scheduling information to a counter for a downlink assignment index for a downlink scheduling portion of the scheduling information.

In addition, in addition to any one of the paragraphs above the reply can comprise a codeword that indicates for each uplink and downlink allocation of the scheduling information that was received either an acknowledgement or a negative acknowledgement, and the indication of discontinuous transmission is encoded within the codeword.

The exemplary embodiments of the invention, as discussed above and as particularly described with respect to exemplary methods, may be implemented as a computer program product comprising program instructions embodied on a tangible computer-readable medium. Execution of the program instructions results in operations comprising steps of utilizing the exemplary embodiments or steps of the method.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate. Embodiments of the invention may be implemented in such a fabricated semiconductor chip, and shown in the design of that chip.

The foregoing description has provided by way of exemplary and non-limiting examples a full and informative description of the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention. Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. In a network communication node, a method comprising:
    receiving scheduling information;
    determining that at least one downlink allocation grant for the communication node of the scheduling information was not received; and
    sending a reply to the received scheduling information that comprises an indication of discontinuous transmission in response to the determining.

2. The method of claim 1 wherein the indication comprises at least one discontinuous transmission bit and the reply comprises at least one acknowledge/negative acknowledge bit of a downlink hybrid automatic repeat request process.

3. The method of claim 1 in which each downlink allocation grant for the communication node of the scheduling information comprises a separate hybrid automatic repeat request process.

4. The method of claim 1, wherein the scheduling information is received on a physical downlink control channel and the reply is sent on a physical uplink shared channel.

5. The method of claim 1, wherein the at least one downlink allocation grant for the communication node comprises a persistent allocation or a semi-persistent allocation.

6. The method of claim 1, wherein the indication comprises a pair or sequence of symbols disposed in pre-determined symbol positions.

7. The method of claim 6, wherein the pair or sequence of symbols corresponds to ACK/NACK symbols spread using a pre-determined sequence.

8. The method of claim 7, where the pre-determined sequence is a Hadamard sequence.

9. The method of claim 1, where the reply comprises a downlink assignment index that indicates a number of downlink allocations grant for the communication node in the scheduling information.

10. The method of claim 1, where the reply comprises selection of a spreading sequence.

11. The method of claim 1, where the reply comprises an explicit indication of discontinuous transmission.

12. An apparatus comprising:
    a receiver;
    a transmitter;
    the receiver configured to receive scheduling information;
    a processor configured to determine that at least one downlink allocation grant for the apparatus of the scheduling information was not received; and
    the transmitter configured to send a reply to the received scheduling information that comprises an indication of discontinuous transmission in response to the determining.

13. The apparatus of claim 12 wherein the indication comprises at least one discontinuous transmission bit and the reply comprises at least one acknowledge/negative acknowledge bit of a downlink hybrid automatic repeat request process.

14. The apparatus of claim 12 in which each downlink allocation grant for the apparatus of the scheduling information comprises a separate hybrid automatic repeat request process.

15. The apparatus of claim 12, wherein the at least one downlink allocation comprises a persistent allocation or a semi-persistent allocation.

16. The apparatus of claim 12, wherein the indication comprises a pair or sequence of symbols disposed in pre-determined symbol positions.

17. The apparatus of claim 16, wherein the pair or sequence of symbols corresponds to ACK/NACK symbols spread using a pre-determined sequence.

18. The apparatus of claim 17, where the pre-determined sequence is a Hadamard sequence.

19. The apparatus of claim 12, where the reply comprises a downlink assignment index that indicates a number of downlink allocations grant for the apparatus in the scheduling information.

20. The apparatus of claim 12, where the reply comprises selection of a spreading sequence.

21. The apparatus of claim 12, where the reply comprises an explicit indication of discontinuous transmission.

22. A computer readable program storage device tangibly embodying a program of instructions executable by the computer to perform actions comprising:
    receiving scheduling information;
    determining that at least one downlink allocation grant for a user equipment of the scheduling information was not received; and
    sending a reply to the received scheduling that comprises an indication of discontinuous transmission in response to the determining.

23. An apparatus comprising:
    means for receiving scheduling information;
    means for determining that at least one downlink allocation grant for the apparatus of the scheduling information was not received; and means for sending a reply to the received scheduling information that comprises an indication of discontinuous transmission in response to the determining.

24. In a network communication node, a method comprising:
sending scheduling information; and
receiving a reply to the scheduling information comprising an indication of discontinuous transmission that at least one downlink allocation grant for a user equipment of the scheduling information was not received.

25. The method of claim 24 wherein the indication comprises at least one discontinuous transmission bit and the reply comprises at least one acknowledge/negative acknowledge bit of a downlink hybrid automatic repeat request process.

26. The method of claim 24, wherein the scheduling information is sent on a physical downlink control channel and the reply is received on a physical uplink shared channel.

27. The method of claim 26, wherein the at least one downlink allocation grant for the user equipment comprises a persistent allocation or a semi-persistent allocation.

28. The method of claim 24, the method comprising jointly decoding at least one of an acknowledgement and a negative acknowledgement of another component of the scheduling information that is received in the reply with the indication of discontinuous transmission.

29. An apparatus comprising:
a receiver;
a transmitter;
the transmitter configured to send scheduling information; and
the receiver configured to receive a reply to the scheduling information comprising an indication of discontinuous transmission that at least one downlink allocation grant for the user equipment of the scheduling information was not received.

30. The apparatus according to claim 29 wherein the indication comprises a single discontinuous transmission bit and the reply comprises a multi-acknowledge/negative acknowledge in which each downlink allocation grant for the user equipment of the scheduling information comprises a separate hybrid automatic repeat request process.

31. The apparatus according to claim 29, wherein the scheduling information is sent on a physical downlink control channel and the reply is received on a physical uplink shared channel.

32. The apparatus according to claim 31, wherein the at least one downlink allocation grant for the user equipment comprises a persistent allocation or a semi-persistent allocation.

33. The apparatus according to claim 29, further comprising a processor configured to jointly decode at least one of an acknowledgement and a negative acknowledgement of another component of the scheduling information that is received in the reply with the indication of discontinuous transmission.

34. A computer readable program storage device tangibly embodying a program of instructions executable by the computer to perform actions comprising:
sending scheduling information; and
receiving a reply to the scheduling information comprising an indication of discontinuous transmission that at least one downlink allocation grant for the user equipment of the scheduling information was not received.

35. An apparatus comprising:
means for sending scheduling information; and
means for receiving a reply to the scheduling information comprising an indication of discontinuous transmission that at least one downlink allocation grant for the user equipment of the scheduling information was not received.

* * * * *